…

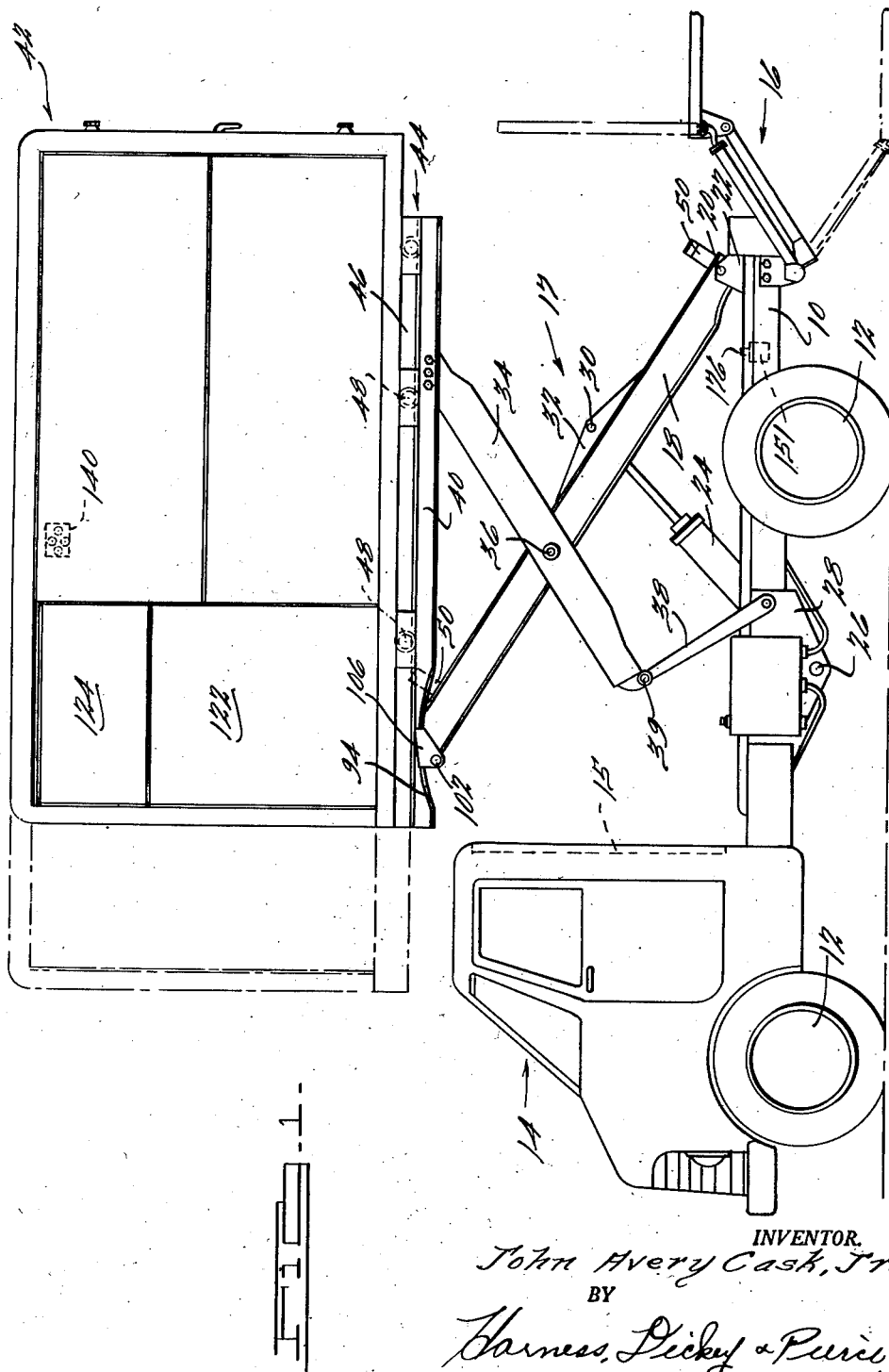

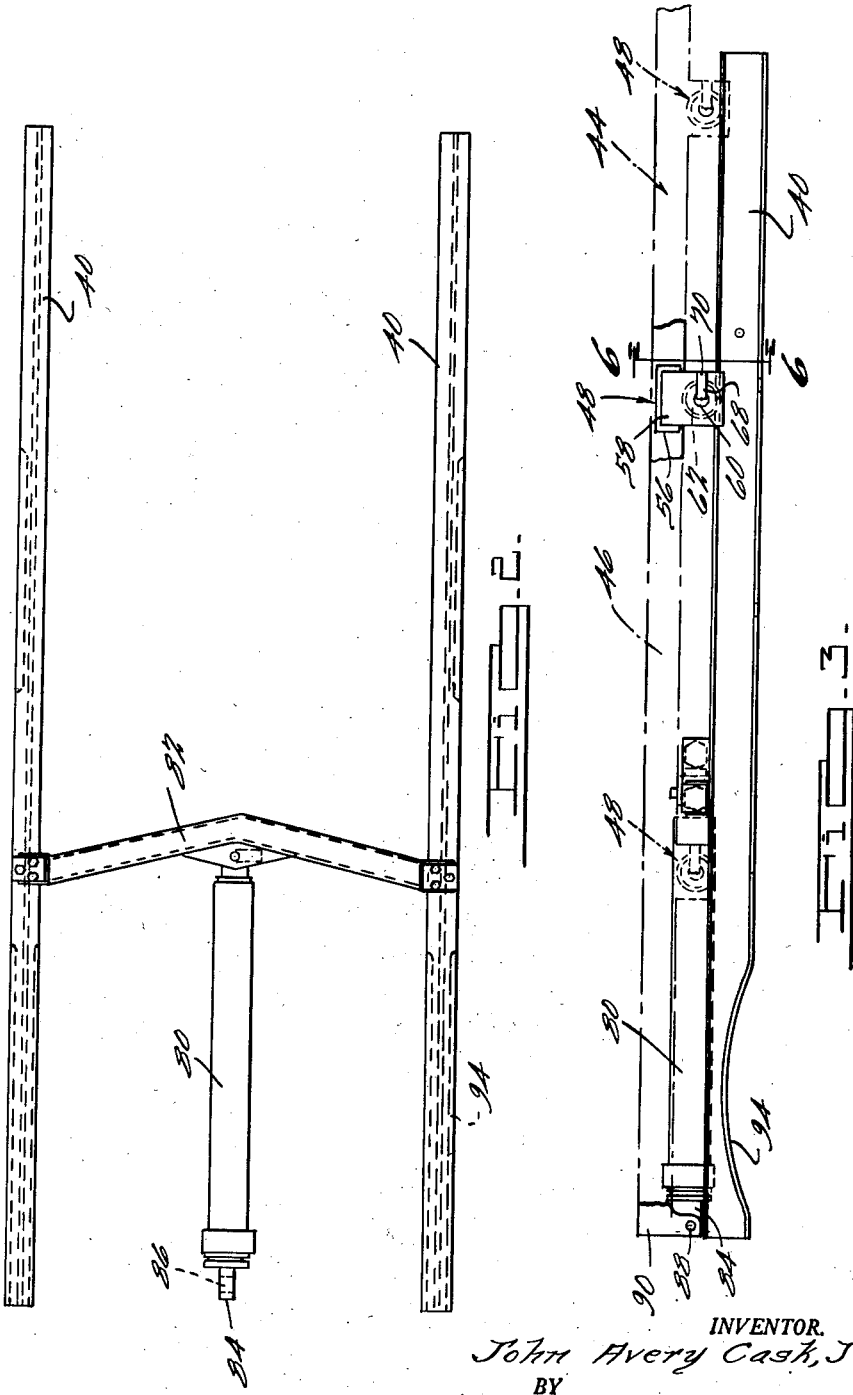

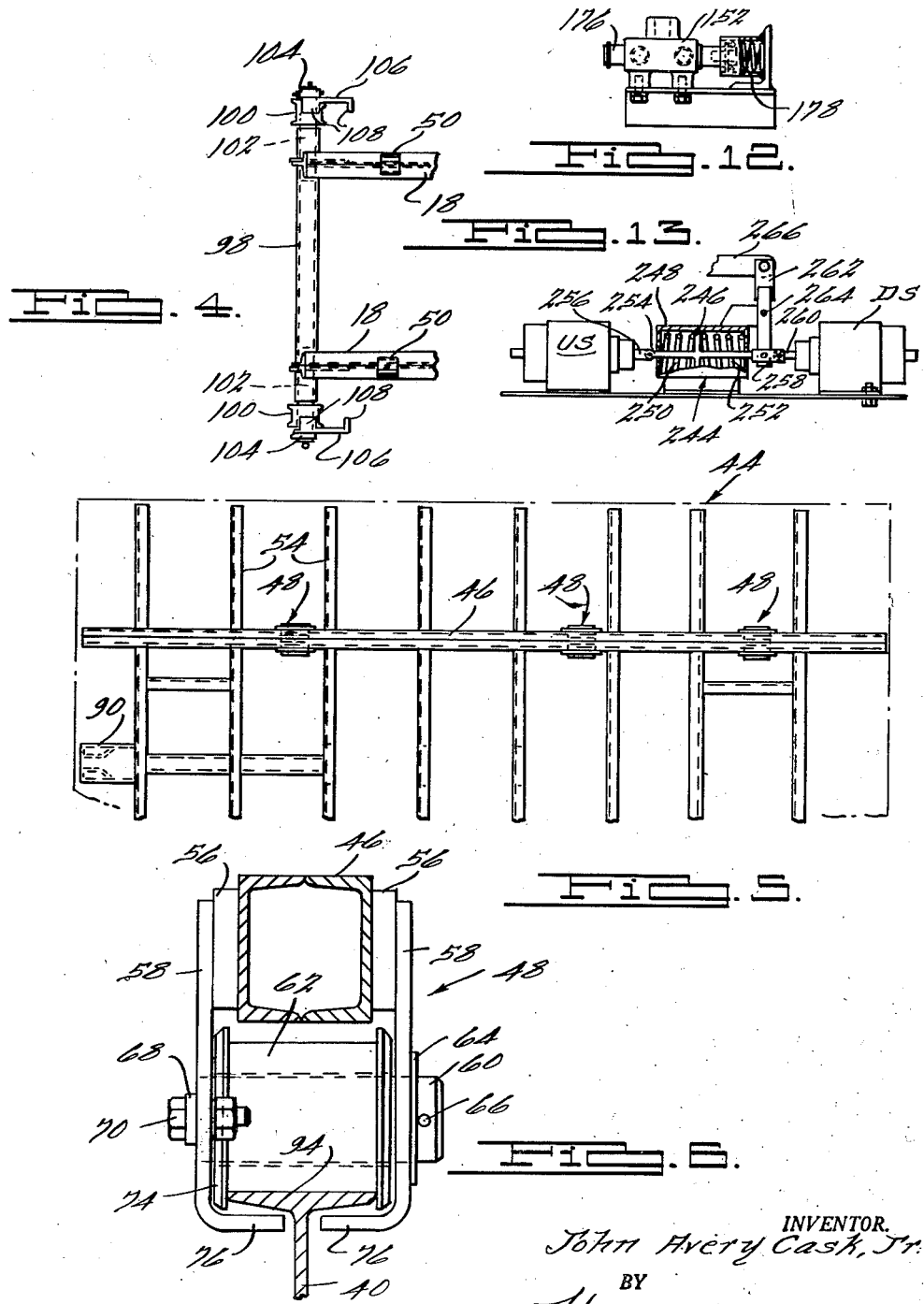

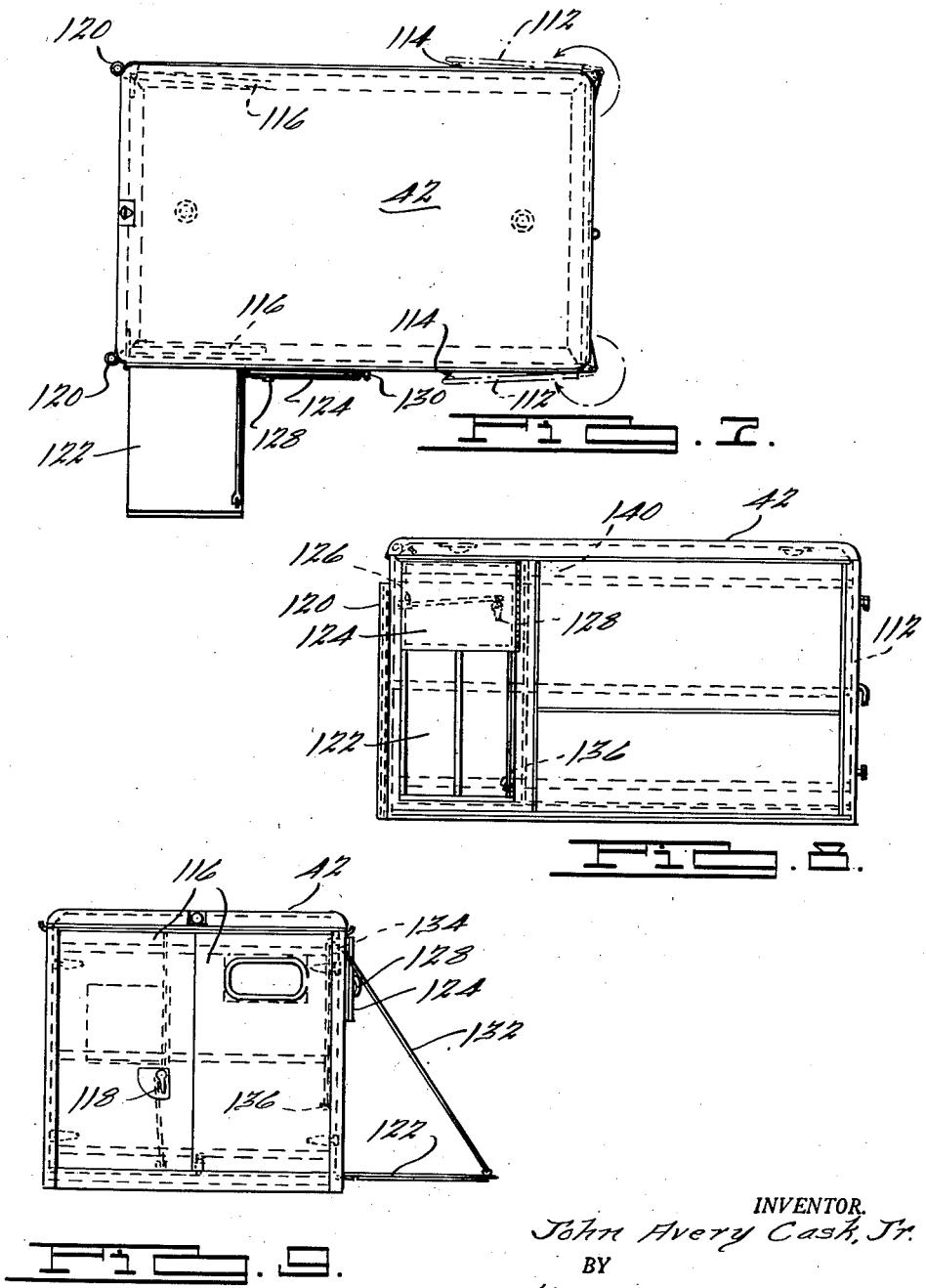

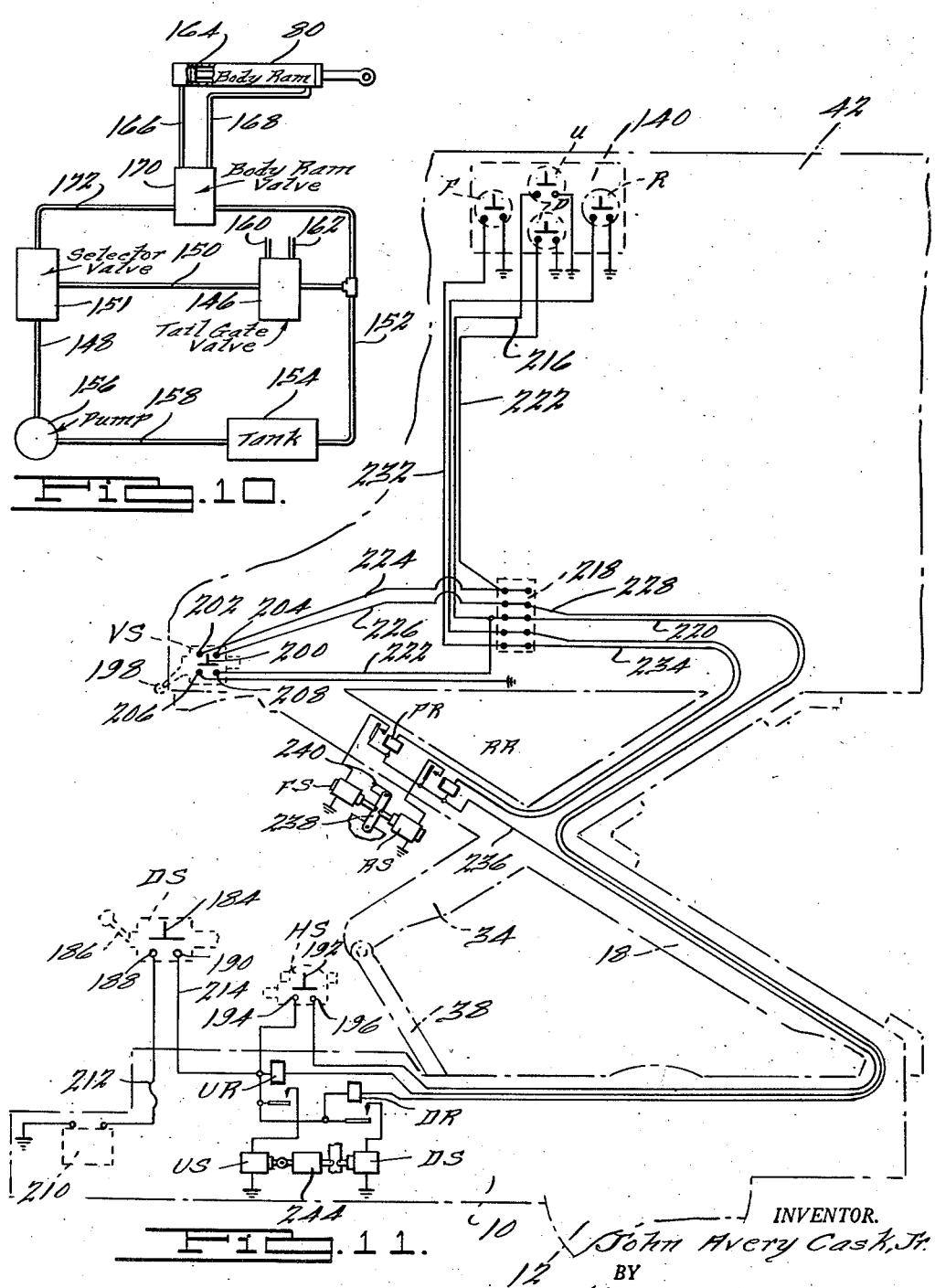

United States Patent Office 2,797,833
Patented July 2, 1957

2,797,833

AIRLINE FOOD LOADER TRUCK

John Avery Cash, Jr., Contra Costa, Calif., assignor to Gar Wood Industries, Inc., Wayne, Mich., a corporation of Michigan Application April 12, 1955, Serial No. 500,769

21 Claims. (Cl. 214—512)

This invention relates to cargo handling apparatus and more particularly to vehicles in which the body is movable with respect to the frame.

The principles of the present invention are exemplarily embodied in a mobile apparatus for transporting food or other cargo to or from an airplane. In its preferred form, this apparatus comprises a truck having an elevatable tailgate and an elevatable and horizontally translatable body. After the food or other cargo is loaded by means of the power-operated tailgate into the truck body through a set of rear doors, the truck is driven to and parked in a position adjacent the airplane, with the truck cab sufficiently close to or underlying the airplane fuselage so as to bring the truck body into proximity to the side or cargo-loading door of the airplane.

The truck driver then enters the truck body through aligned doors at the rear of the cab and at the front of the body and operates an electrically controlled hydraulic mechanism to cause the truck body to be moved upwardly to a point where the floor of the body is above the level of the cab and approximately in with the sill of the airplane's side door. He then operates additional electrically controlled mechanism to move the truck body forwardly over the cab into close proximity or abutment with the airplane. The body may then be moved in small increments in either a vertical or a horizontal sense to obtain proper alignment between the airplane door and the doors at the forward end of the truck body. The load may then be transferred from the truck body to the airplane through those aligned doors, a short ramp being employed to bridge any gap between the floors of the airplane and of the truck body.

In some circumstances, it may be necessary or desirable to transfer the food or other cargo to the airplane through the passenger loading door via the passenger loading platform. This may be accomplished with the same truck-to-airplane orientation by virtue of the provision of a side door and ramp assembly on the truck body which, when lowered, bridges the space between the floor of the truck body and the passenger platform. Again, by appropriate actuation of the electrical controls, the truck body may be moved into proper lateral alignment with the passenger platform, with its floor, the ramp, and the loading platform being substantially coplanar.

A number of features may be and preferably are incorporated in the construction for convenience of operation and to prevent injury to the operator or damage to the equipment. Thus, the switches for controlling the movement of the body are desirably located within the body, and both these switches and the hydraulic control mechanisms are preferably of the "dead-man" type whereby the equipment can be actuated only as a result of continuous, intentional effort on the part of the operator and whereby upon the release of any switch, the equipment is immediately immobilized and effectively locked.

Additionally, limit switches may be appropriately physically positioned and electrically connected to prevent movement of the truck body unless the rear cab door is closed, to prevent forward motion of the truck body unless it is sufficiently elevated to clear the truck cab, and to prevent lowering of the body into engagement with the truck cab.

The disclosed embodiment of the invention has a number of other significant features, particularly in certain details of its mechanical, electrical and hydraulic apparatus and arrangements, as will be appreciated from the following detailed description of that embodiment, when read with reference to the accompanying drawings in which:

Figure 1 is a side elevational view of a truck provided with an elevating tailgate assembly and with a body which is movable in both a horizontal and a vertical sense relative to the truck frame under electrical and hydraulic control, all in accordance with the principles of the invention, the truck body being shown in an elevated position;

Fig. 2 is a plan view of a longitudinal system relative to which the truck body of Fig. 1 can be moved in a horizontal sense;

Fig. 3 is a side elevational view of the longitudinal system represented in Fig. 2 of the drawings as well as of portions of the truck body under-construction and the rollers therebetween;

Fig. 4 is a fragmentary top plan view of the forward-most portion of the hoist assembly;

Fig. 5 is a fragmentary top plan view of the truck body under-construction;

Fig. 6 is a sectional view taken substantially along the line 6—6 of Fig. 3;

Fig. 7 is a top plan view of the truck body with all doors in their open positions;

Fig. 8 is a side elevational view of the truck body represented in Fig. 7, but with the doors closed;

Fig. 9 is an end elevational view of the truck body of Fig. 8 with certain of the doors closed and others open;

Fig. 10 is a block schematic representation of certain of the hydraulic circuits;

Fig. 11 is a schematic representation of the electrical control circuits, with portions of the truck being represented in phantom so as to depict the approximate positional relationships between the several elements of the electrical control system and the truck structure;

Fig. 12 is an elevational view of the selector valve which is a constituent element of the hydraulic system represented in Fig. 10; and Fig. 13 is an enlarged side elevational view of a portion of the electrical system represented in Fig. 11 of the drawings.

Referring first to Fig. 1 of the drawings, the disclosed truck comprises a frame 10 supported on wheels 12 and supporting a cab 14. These portions are conventional in design and construction except that the cab 14 is appropriately configured to permit the forward end of the truck to be moved into underlying relationship to the fuselage of an airplane which is being loaded and except that the rear of the cab is provided with a laterally sliding door, represented at 15, by means of which the driver may enter the body of the truck through doors therein hereinafter to be described.

The frame 10 supports a hydraulically actuating elevating tailgate assembly 16 which may be of any suitable known type. The frame 10 also supports a hoist assembly 17 which may be of any suitable type, a number of which are available on the commercial market. Exemplarily, the hoist assembly 17 comprises a pair of spaced apart but interconnected main lifting I beams 18 pivotally mounted at 20 to extensions 22 at the rear of the frame 10. The main lifting beams 18 are caused to rotate, about the pivotal axis 20 and between the shown elevated position and a lowered, substantially horizontal position, by means of a ram 24 the body portion of which is pivoted at 26 to plates 28 mounted to the frame 10 and the piston rod of which is pivotally mounted at 30 to a lifting bracket assembly 32 integral with the main lifting beam 18. A second pair of beams 34 is pivotally associated with the main lifting beams 18 by means of a rocker shaft 36. The lower end of each of the beams 34 is associated with the frame 10 through the medium of a link 38, the lower end of each of the beams 34 being pivotally connected to the upper end of its individual link 38 by a pin 39 and the lower end of each of the links 38 being pivotally associated with an individual one of the plates 28.

The upper end of each of the beams 34 is pivoted to an individual one of a pair of parallel longitudinals 40, and the upper end of each of the main lifting beams 18 is associated with an individual one of the longitudinals 40 by means of a roller system hereinafter to be described. By appropriate hydraulic control of the ram 24, the hoist assembly 17 may be elevated or depressed to move the longitudinals 40 between their shown position and a position in proximity to or abutment with the frame 10 of the truck.

The body 42 is provided with an under-construction 44 which comprises a pair of spaced-apart main support members 46 overlying the longitudinals 40. A plurality of roller assemblies 48 is mounted on each of the rails so as to engage an individual one of the longitudinals 40. Hydraulic means, to be described, serves to move the body 42 and its under-construction 44 on the roller assemblies 48 along the longitudinals 40 between the shown position and a forward position represented in phantom in Fig. 1.

By virtue of this construction, the body 42 may be moved in translation in a substantially horizontal sense and in either of two horizontal directions between a forwardmost and a rearmost position, and the body 42 may be moved in translation in a substantially vertical sense and in either of two vertical directions between an upper and a lower position. The uppermost position of the body 42 is determined by the geometry of the hoist assembly 17 and the design of the ram 24. The lowermost position of the body 42 is determined by the fully collapsed state of the hoist assembly 17, in which the main lifting beams 18 are in substantially spaced or abutting parallelism with the frame members 10, the body 42, however, actually resting on two pairs of rest assemblies 50, one such assembly being mounted at each end of each of the main lifting beams 18. The positive supporting of the body 42 upon the body rest assemblies 50 relieves any possibility of the body 42 shifting in a horizontal plane relative to the frame 10 when the body 42 is in its lowered position, due to mechanical shocks or to gravitational forces when the truck is travelling on a non-horizontal surface.

Considering now certain portions of the system in somewhat more detail, the longitudinals 40, which are shown in plan view in Fig. 2 of the drawings, are preferably in the form of I beams, with the web vertical and flanges horizontal. As beforestated, the body 42 can be moved forward and aft along the longitudinals 40, the body 42 being integral with the under-construction 44. As may best be seen from the fragmentary top plan view of Fig. 5 of the drawings, the under-construction 44 comprises a pair of main support members 46 (but one of which is shown), each preferably of a boxed channel construction, and a plurality of transverse, channel-section cross members 54 positioned in spaced parallelism one with the other and welded to each of the main support members 46 at each intersection therewith.

The roller assemblies 48 are affixed to each of the main support members 46 in the manner best shown in Figs. 3 and 6 of the drawings. A pair of spacers 56 are mounted on either side of the main support member 46 and a downwardly extending plate or bracket 58 is mounted, by welding or otherwise, on each of the spacers 56. A pin 60 extends through aligned apertures in the two brackets 58 and through a central aperture in a roller 62. The pin 60 is retained in position at one end by a washer 64 and cotter pin 66, and at the other end by a strap 68 which is welded or otherwise affixed to the pin and which is attached to one of the brackets 58 by a bolt 70. Thus, the pin 68 is secured against either translational or rotational motion relative to the brackets 58.

The translational motion of the body under-construction 44, and hence of the body 42, relative to the longitudinals 40 is accomplished hydraulically through a body ram 80 (Figs. 2 and 3). The body portion of the ram 80 is anchored to a weldment 82 which extends transversely between the longitudinals 40 and is bolted or otherwise affixed to a flange thereof. The piston rod 84 of the ram 80 is provided with a cross aperture 86 (Fig. 2) engageable with a trunnion pin 88 (Fig. 3) which also engages aligned apertures in a body trunnion 90 (Figs. 3 and 5) welded or otherwise affixed to and as an element of the body under-construction 44. Thus, by appropriate control of the ram 80, the body under-construction 44, and hence the body 42, may be caused to move forward and aft of the truck on the longitudinals 40, the extent of that motion being determined by the design of the ram 80.

As beforestated the longitudinals 40 are exemplarily shown to be I beams, but the configuration of these beams is modified, in the disclosed embodiment of the invention, to obtain improved performance during the vertical hoisting operation. Thus, referring to Fig. 1, it is feasible to devise a hoist assembly 17 which, throughout its motion, will maintain the longitudinals 40 in strict parallelism with the frame 10. However, a hoist assembly 17 such as that disclosed possesses certain advantages in manufacture and use which merits its employment even through that hoist assembly 17, per se, is not truly pantographic in its operation. Thus, it will be seen that while their use is highly advantageous from other standpoints, the links 38 do tend to produce a motion of the beams 34 such that the longitudinals 40 can be parallel to the frame members 10 only at two selected points over the entire amplitude of motion of the hoist assembly 17. This results in a tilting of the body 42 to a slight degree during its upward motion, which may be undesirable, particularly if the cargo to be transferred to the airplane is mounted upon casters.

It has been found that the longitudinals 40 may be maintained in parallelism with the frame members 10 throughout their motion by appropriately forming those surfaces on the longitudinals 40 which are engaged by rollers mounted at the upper end of the main lifting beams 18. In the embodiment shown (Figs. 1 to 3), the lower flange of each of the longitudinals 40 is provided with an arcuate portion 94 near its forwardmost end. It will be observed that while a portion of the web is removed, the lower flange is intact except that it is somewhat narrowed, as is represented in Fig. 2 of the drawings.

It is this narrowed and curved portion 94 of each of the longitudinals 40 which is engaged by rollers on the upper end of the main lifting beams 18. The forward end of the main lifting beam construction may be seen in top plan view in Fig. 4 of the drawings. At their forwardmost ends, the main lifting I beams 18 are interjoined by a roller shaft assembly 98 at each end of which a roller 100 is rotatably mounted. In the disclosed arrangement, the roller shaft assembly 98 comprises a stub shaft 102 inserted and fixed within each end of a tubular casing so that the ends of the outer tubular casing are adjacent the inner faces of the rollers 100 and therefore serve to prevent relative translational motion between the roller shaft assembly 98 and the rollers 100.

A collar 104 is bolted or otherwise affixed to the outer end of each of the stub shafts 102, and a body hold-down clip 106 is placed upon each of the stub shafts 102 intermediate the roller 100 and the collar 104. Each body hold-down clip 106 is provided with a pair of inwardly extending projections 108 adapted to overlie the upper surface of the reduced-width flange portion 94 (Fig. 3) on the longitudinals 40. Each of the rollers 100 is provided with suitable side flanges so that both the face and the two edges of the reduced flange portion 94 are engaged by the roller 100. As a consequence, the rollers 100 cannot move laterally, along their axis of rotation, relative to the longitudinals 40 and, due to the presence of body hold-down clips 106, rollers 100 cannot become accidentally separated from the longitudinals 40. By virtue of the described configuration of the longitudinals 40, the distance between the extreme upper end of the main lifting beams 18 (Fig. 1) and the body 42 will vary in accordance with the amount of elevation of the body 42 with respect to the frame 10. This variation is designed to compensate for the lack of exact pantographic operation of the hoist assembly 17. As a result, throughout the vertical motion of hoist 17, longitudinals 40, the body under-construction 44, and the body 42 will remain parallel with the frame 10.

The body 42, as represented in detail in Figs. 7 to 9 of the drawings, is preferably provided with a pair of outwardly swinging rear doors 112 which may be opened to permit the loading of cargo into the body by means of the elevating tailgate assembly 16. Latching mechanisms 114 are preferably provided on the outer sides of the body 42 so that the doors 112 may be latched in their open position if desired. Doors 116 at the front of the body 42 perferably are hinged to open inwardly, since it is intended that the body 42 shall be placed in abutment with the fuselage of the airplane which is to be loaded. It will be observed that the driver of the vehicle may gain access to the body 42 without leaving the truck by opening the sliding door 15 on the cab 14 (Fig. 1) from inside the cab, and then opening one of the doors 116 (Fig. 9) by actuating the recessed latch 118.

When the body 42 is in its elevated and advanced position, with the rubber bumpers 120 (Figs. 7 and 8), mounted on the outboard edges of the body 42, in or substantially in engagement with the side of the airplane's fuselage, both doors 116 may be fully opened inwardly. This serves to insure that some portion of the front end of the body 42 will be aligned with the somewhat narrower door in the airplane even though the truck body 42 has not been precisely laterally positioned. It is contemplated that a small portable deck plate, adapted to be placed on the sill of the doors 116 and of the airplane's door to bridge the gap therebetween, will be carried within the body 42.

Some aircraft are not provided with separate side cargo loading doors, necessitating the loading of the cargo through the passenger entrance, this normally cannot be accomplished, however, merely by aligning the front of the body 42 with the passenger entrance since at the time that certain cargo, such as food, is loaded on the airplane, the passenger loading ramp must be in place under existing regulatory requirements.

The conventional passenger loading ramp is provided with a platform or landing at its top and the guard rail at one side thereof is normally hinged so as to be swung as a gate to permit lateral access to that platform or landing. Therefore, the cargo from the body 42 can be loaded to the platform or landing of the passenger loading ramp and through the passenger entrance if a side door and ramp be provided on the truck body 42.

In the disclosed embodiment of the invention, the side door is a combined double door, ramp and window arrangement. Thus, a ramp 122 is mounted along its bottom edge, preferably by a continuous hinge, on the lefthand side and near the front of the body 42. An upper side door 124, shown closed in Fig. 8 and open in Figs. 7 and 9, is hinged about its rearmost edge so as to be swung about a vertical axis. Door 124 may be maintained in closed position by a latch 126 (Fig. 8) controlled by a handle 128 operable from within the body 42, and may be maintained in an open position (Fig. 7) by means of a clip 130 mounted on the exterior of the body 42. The upper door 124 is designed to overlap the upper edge of the ramp 122 so that, when both are closed, the upper door 124 positively locks the ramp 122 in closed position. The lowering of the ramp 122 is controlled and the closing is accomplished through the medium of a rope 132 (Fig. 9) anchored to the outermost edge of the door 122 and passing over a sheave 134 mounted to the body 42. The other end of the rope 132 is preferably provided with a hook 136 by means of which it may be secured to the body 42 at appropriate opened and closed positions of the door 122.

It will be observed that while the upper door 124 serves the function of positively latching the ramp 122 in its closed position, the provision of the controlling rope 132 enables the door 122 to be maintained in a closed position even though the upper door 124 is fully open, so that the operator may open the door 124 and look therethrough while he is adjusting the position of the body 42 relative to the passenger loading ramp.

The elevating tailgate asembly 16 (Fig. 1) may be controllable either from the side of the vehicle or from the cab 14, but the hoist assembly 17 and the body ram 80 (Figs. 2 and 3) are preferably controlled from within the body 42 such as by an electrical control panel 140 (Figs. 1 and 8) preferably positioned on one wall of the body 42 and at a location sufficiently high so as to avoid the possibility of inadvertent operation. As will be seen, the main elements on the control panel 140 are four depressto-close electrical switches spring biased to their open position, and arranged to control the upward, downward, forward, and rearward motion of the body 42.

The hydraulic mechanism for actuating the hoist assembly 17 to move the body 42 in a vertical sense is conventional in design, well known in the art, and therefore not illustrated in detail. In general, the ram 24 comprises a double-acting piston, the differential hydraulic pressures applied to which are controlled by a multiposition valve (not shown). Apart from the obvious requisite that this valve should be capable of varying the applied pressure so that the ram 24 may be caused to both elevate and depress the hoist assembly 17, the valve should preferably be so designed that in its neutral position both sides of the cylinder of the ram are blocked so that the hoist assembly 17 is effectively hydraulically locked in any preselected position. The position of the spool of this valve is controlled electrically in a manner hereinafter to be described.

The elevating tailgate assembly 16 (Fig. 1) is actuated by a hydraulic ram including a double-acting piston controlled by a tailgate valve 146 (Fig. 10). Valve 146 is conventional in design, preferably being of a manually controlled, three-position, double-acting, four-way open center circuit type with an internal spring construction for returning the plunger to its neutral position. In that neutral position, the hydraulic pump and the fluid reservoir or tank should be interconnected, but the cylinder ports should each be blocked. Thus, referring to Fig. 10 of the drawings, assuming the pressure conduit 148 leading from the hydraulic pump 156 is connected to the conduit 150 by the selector valve 152, which operates in a manner hereinafter to be described, in the neutral position of tailgate valve 146, fluid conduit 150 is connected to conduit 152 which, in turn, is connected to the fluid reservoir or tank 154, that tank being connected to the return of the pump 156 by a conduit 158. Further, in the neutral position of the tailgate valve 146 the two conduits 160 and 162 leading to the tailgate ram are preferably each blocked. In the two operating positions of the valve 146, the two conduits 160 and 162 are alternatively employed as pressure lines and returns, in the conventional manner.

The body ram 80 includes a double-acting piston 164 (Fig. 10) the motion of which is controlled by the differential hydraulic pressures existing between conduits 166 and 168 as controlled by body ram valve 170. Valve 170 is preferably identical or similar to the tailgate valve 146 previously described except that the position of the spool thereof is controlled electrically in a manner hereinafter to be described.

Body ram valve 170 is connected to the tank 154 by the return conduit 152 and is connectable to the pump 156 via conduits 148 and 172 and selector valve 151. By virtue of the provision of selector valve 151, a single pump 156 and tank 154 may be employed to actuate both the tailgate assembly 16 and the body ram 80 since those actuating mechanisms are only employed alternatively in the present construction.

Selector valve 151, the exterior configuration of which is represented in Fig. 12 of the drawings, is of the two-position type. In its lower position, with its valve spool 176 depressed (to the right in the view of Fig. 12), conduit 172 (Fig. 10) is blocked and conduit 148 is connected to conduit 150. When selector 151 is released, with its spool 176 moved upwardly (to the left in the representation of Fig. 12), conduit 150 (Fig. 10) is blocked and conduit 148 is connected to conduit 172.

The physical position of selector valve 151 is approximately indicated in Fig. 1 of the drawings, the valve preferably being mounted on the frame 10, or on the subframe of the hoist assembly 17 if one is provided, in a position wherein its spool 176 will be engaged by one of the main lifting beams 18 as the hoist assembly 17 is lowered. Thus, when the hoist assembly 17 is fully lowered, the valve spool 176 will be depressed so that the hydraulic pressure from the pump 156 (Fig. 10) is applied to the tailgate valve 146 whereby the elevating tailgate assembly 16 may be actuated and controlled in the normal manner. However, when the hoist assembly 17 is operated to move the body 42 upwardly, the valve spool 176 is forced to move upwardly (to the left in the view of Fig. 12) by the return spring assembly 178 (Fig. 12). In this position of selector valve 151, the tailgate assembly 16 is disabled (but hydraulically locked in position), and the pump 156 is connected to the body ram valve 170 so that the body 42 may be moved in a horizontal sense, other conditions, hereinafter to be noted, being met.

In the electrical circuits represented in Fig. 11 of the drawings, the several constituent elements of the apparatus have not been shown in their precise physical relationship to each other or to the truck, but an effort has been made to represent their approximate functional positions to facilitate an understanding of the functions which they are to perform.

The control panel 140, as beforestated, includes four switches each of which is of the depress-to-operate type and each of which is spring biased to its unoperated position so that a circuit is closed through the switch only when the operator is intentionally holding the switch depressed, and so that upon accidental or intentional release of pressure upon the switch, the circuit will immediately be opened. In general, assuming other later described conditions to be met, closure of switch F will cause the operation of relay FR to energize solenoid FS to actuate body ram valve 170 to force the body ram 80 to move the body 42 forwardly; the depression of switch R will operate relay RR to energize solenoid RS to control body ram valve 170 to force ram 80 to move the body 42 rearwardly; the depression of switch U will cause the operation of relay UR to energize solenoid US to force the hoist ram 24 to move the body 42 upwardly; and the depression of switch D will operate relay DR to actuate solenoid DS to force the hoist ram 24 to move the body 42 downwardly.

These selective manipulations of the body 42 are conditioned upon the proper actuation of certain safety devices. Thus, as a safety precaution, the body 42 can not be moved in any direction relative to the truck unless the door 15 (Fig. 1) at the rear of the cab 14 is closed. This is accomplished by the door switch DS (Fig. 11) which is provided with a contactor 184 controlled by a lever 186. Switch DS is suitably positioned so that contactor 184 will not bridge the contacts 188 and 190 unless the door 15 has been completely closed so as to strike and move lever 186.

Further, the body 42 can not be moved in a horizontal sense relative to the rest of the truck unless it is first adequately elevated so that the body 42, in moving forwardly, will not strike the cab 14. This may be accomplished by placing a limit switch in operative relation to any suitable portion of the total equipment the position of which varies as a function of the height of the body 42 relative to the cab 14. Exemplarily, a switch such as switch HS may be placed in operational relationship with a link 38. Switch HS is so positioned relative to link 38 that its contactor 192 will be out of bridging relationship with its contacts 194 and 196 whenever the angle between the link 38 and the frame 10 is less than a preselected angle, but when the link 38 is swung through an angle sufficiently great so that the body 42 is above the level of the cab 14, the contactor 192 of the switch HS will establish bridging relationship between the contacts 194 and 196. Obviously, any appropriate type of limit switch may be employed.

As an additional safety feature, means are provided for preventing downward movement of the body 42 into engagement with the top of the cab 14. This means may comprise a vertical switch VS having an actuating lever 198 extending forwardly and downwardly from the body 42. When the actuating lever 198 is not contacting the top of the cab 14, contactor 200 of switch VS is in bridging relationship to contacts 202 and 204, which, as will be seen, enables the circuit controlling the downward motion of the body 42. However, if during the course of downward movement the actuating lever 198 strikes the top of the cab 14 contactor 200 is moved out of bridging relationship with contacts 202 and 204 to disable the downward motion controlling mechanism, thereby stopping the motion of body 42.

If desired, switch VS and associated circuits may be arranged so that the body 42 will be automatically moved to a given preselected minimum distance above the top of the cab 14. Thus, contactor 200 may be made to bridge a second pair of contacts 206 and 208 to actuate the upward motion control mechanism until the body 42 has moved upwardly to the aforesaid preselected minimum distance, at which point lever 198 will restore to a position in which contactor 200 is removed from its bridging relationship with contacts 206 and 208 and is again moved into bridging relationship with the contacts 202 and 204.

Considering the circuits in detail, a battery 210, one terminal of which is grounded, serves as the power source. The output of battery 210 is fused at 212 and is applied through switch DS to conductor 214. Since conductor 214 is the supply line to all of the operating control circuits, it will be observed that no change in the relative position of body 42 can be accomplished unless the contactor 184 of the switch DS is in bridging relation to the contacts 188 and 190, i. e., unless the cab door 15 is closed. Assuming that this is the case and that therefore a voltage exists between conductor 214 and ground, the operator can move the vehicle body 42 upwardly by depressing switch U on control panel 140, which will complete a circuit from ground through switch U, conductor 216, terminal strip 218, conductor 220, and through the winding of relay UR to conductor 214. The resultant current through the winding of relay UR will cause its contacts to close to apply the voltage on conductor 214 through those contacts and to ground through the winding of solenoid US. This energization of solenoid US will result in appropriate control of the hydraulic mechanism as will be noted hereinafter.

If the body 42 is not too closely overlying the cab 214, and if, as a result, contactor 200 of switch VS is in bridging relation to contacts 202 and 204, the operator may move the truck body 42 downwardly by closing switch D on control panel 140 to complete a circuit from ground through that switch, conductor 222, conductor 224, contact 202, contactor 200, contact 204, conductor 226, terminal strip 218, conductor 228, and to conductor 214 through the winding of relay DR. Relay DR, in operating, completes a circuit from the voltage supply conductor 214 through its contacts and to ground through the winding of solenoid DS to produce an appropriate operation of the hoist assembly 17 to move the body 42 downwardly as will be described hereinafter.

If the body 42 is in overlying relationship to the cab 14, during the downward course of motion of the body 42 the actuating lever 198 of switch VS will engage the upper surface of the cab 14 to separate contactor 200 from contacts 202 and 204 to interrupt the previously traced path and terminate the downward movement of body 42. Additionally, contactor 200 will be moved into bridging relationship with contacts 206 and 208 to complete a circuit from ground, through those contacts, and to conductor 222. As before-described, when conductor 222 is grounded, an upward motion of the body 42 is produced. This upward motion will continue until actuating lever 198 of switch VS is separated from the top of the cab 14, at which time the body 42 will come to rest.

If the body 42 is adequately elevated so that it will not strike the cab 14 during forward motion, i. e., if it is adequately elevated so that contactor 192 of switch HS is in bridging relationship to contacts 194 and 196 thereof, the operator may move the body 42 forwardly by depressing switch F to complete a circuit from ground, through the contacts of switch F, conductor 232, terminal strip 218, conductor 234, winding of the forward relay FR, conductor 236, contacts 196 and 194 and contactor 192 of switch HS, and to the voltage-supply conductor 214. The resultant operation of relay FR will cause the voltage on conductor 236 to be applied through the contacts of that relay and through the winding of the forward solenoid FS to ground, to operate that solenoid. Solenoid FS rotates a lever 238 in an appropriate direction to properly actuate the body ram valve 170 (Fig. 10), to which it is mechanically connected by a link 240, to force the ram 80 to move the body 42 in a forward direction.

Similarly, the operator can cause the body 42 to be moved rearwardly by depressing switch R to operate relay RR to actuate solenoid RS which is also coupled to lever 238. However, solenoid RS rotates lever 238 in a direction to move valve 170 to a position to force the ram 80 to move the body 42 rearwardly. As before noted, the valve 170 is intended to be provided with a centering return spring so that whenever both solenoids FS and RS are de-energized, the valve 170 will immediately restore to its neutral position, wherein the body ram 80 is effectively hydraulically locked.

It is assumed that in the disclosed embodiment of the invention the control valve (not shown) for the ram 24 of the hoist assembly 17 is not of the self-centering type, and consequently that additional means must be provided for forcing that valve to assume its neutral, center position, wherein the ram 24 is effectively hydraulically locked, whenever both the solenoids US and DS are de-energized. This means, more clearly disclosed in an enlarged view of Fig. 13 of the drawings, comprises a spring-centering mechanism 244 interposed the solenoids US and DS. Mechanism 244 is exemplarily shown to comprise a disc 246 slidably disposed in a casing 248 and tending to remain centered therein due to the opposing forces exerted by springs 250 and 252 acting between the two end walls of the casing 248 and the opposite faces of the disc 246. Rod 254, integral with disc 246, is pivotally connected to the moveable core element 256 of the solenoid US, and rod 258, also integral with disc 246, is pivotally connected to the moveable core 260 of solenoid DS. An arm 262, pivotally mounted at 264, is pivotally connected to rod 258 and core 260 and is also pivotally connected to a link 266 which is connected to the valve spool of the hydraulic valve (not shown) which controls the hoist assembly ram 24.

It will be observed that, for full safety protection, not only are various limit switches such as VS, DS and HS provided, but also all operating mechanisms are of the type designed to provide "dead-man" operation. Thus, the hydraulic valves, when released, are provided with either internal or ancillary apparatus for forcing them to return to center when released, and are of the type wherein the output ports to the cylinder which they control are blocked when the valve is in that center position. Further, the relays are of the non-locking type, and all switches are designed to immediately open unless the operator affirmatively holds them in their closed positions.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a vehicle for carrying cargo, a generally horizontally disposed frame, a body, hydraulic means including a first hydraulic ram and effective only when a positive actuating force is applied thereto for moving said body relative to said frame in a vertical sense, and hydraulic means including a second hydraulic ram and effective only when a positive actuating force is applied thereto for moving said body relative to said frame in a horizontal sense.

2. In a vehicle for carrying cargo, a generally horizontally disposed frame, a body, hydraulic means including a first hydraulic ram and effective only when a positive actuating force is applied thereto for moving said body relative to said frame in a vertical sense, hydraulic means including a second hydraulic ram and effective only when a positive actuating force is applied thereto for moving said body relative to said frame in a horizontal sense, and electrical means for applying a positive actuating force to both of said hydraulic means, said electrical means being effective only when a positive actuating force is applied thereto.

3. In a vehicle for carrying cargo, a generally horizontally disposed frame, a body, hydraulic means including a first hydraulic ram and for locking said body against vertical motion relative to said frame but effective when a positive actuating force is applied thereto to move said body relative to said frame in a vertical sense, and hydraulic means including a second hydraulic ram and for locking said body against horizontal motion relative to said frame but effective when a positive actuating force is applied thereto to move said body relative to said frame in a horizontal sense.

4. In a vehicle for carrying cargo, a generally horizontally disposed frame, a body, hydraulic means for locking said body against vertical motion relative to said frame but effective when a positive actuating force is applied thereto to move said body relative to said frame in a vertical sense, hydraulic means for locking said body against horizontal motion relative to said frame but effective when a positive actuating force is applied thereto to move said body relative to said frame in a horizontal sense, and electrical means for applying a positive actuating force to both of said hydraulic means, said electrical means being effective only when a positive actuating force is applied thereto.

5. In a vehicle for carrying cargo, a frame, a body, a ram selectively actuatable to move said body in either of two directions relative to said frame, means including a hydraulic valve for controlling said ram, said valve having a center position in which said ram is hydraulically locked against motion and two other positions in which said ram is selectively moved in either of two directions, control means for applying actuating forces to selectively move said valve to either of said other positions, and automatic means for restoring said valve to its said center position when said actuating forces are relieved.

6. In a vehicle for loading cargo through a portal disposed generally forward of and above the vehicle, a generally horizontally disposed frame, a body including a forward wall, a cargo discharge opening in said forward wall, means for moving said body relative to said frame in a vertical sense to obtain alignment between said portal and said discharge opening, and means for moving said body forward relative to said frame to bring said discharge opening into close proximity to said portal.

7. In a vehicle for loading cargo onto a platform disposed generally above and laterally of the vehicle, a generally horizontally disposed frame, a body including a side wall, a discharge opening in said side wall, means for moving said body upward and forward relative to said frame to bring said discharge opening substantially into spaced alignment with said platform, and ramp means for alternatively closing a portion of said discharge opening and bridging the lateral distance between said discharge opening and said platform.

8. In a vehicle for loading cargo onto a platform, a body having a discharge opening, a ramp hinged about a horizontal axis along its bottom adjacent said opening and adapted to at least partially close said discharge opening, a door hinged about a vertical axis along one of its edges adjacent said opening and adapted to overlie a portion of said ramp when both said ramp and said door are closed, and means for latching said door closed.

9. In a vehicle for loading cargo onto a platform, an enclosed body having a discharge opening, a ramp hinged along its bottom adjacent said opening and adapted to at least partially close said discharge opening, a door hinged along one of its edges adjacent said opening and adapted to overlie a portion of said ramp when closed, means for selectively retaining said ramp in closed position, and means for latching said door closed.

10. In a vehicle having an elevatable body, a frame, a body support member including a surface having a rectilinear portion in substantial parallelism with said frame and a curved portion, and a hoist mechanism comprising a first member connected to said support member and movably related to said frame, and a second member pivotally connected to said frame and to said first member and having a portion movable along said curved portion of said support member.

11. In a vehicle having an elevatable body, a frame, a body support member including a surface having a rectilinear portion in substantial parallelism with said frame and an arcuate portion, and a hoist mechanism comprising a first member connected to said support member and movably related to said frame, a second member pivotally connected to said frame and to said first member, and a roller rotatably mounted on said second member and engageable with said arcuate portion of said support member.

12. In a vehicle, a frame, a body, a tailgate, a hydraulic pump, first hydraulically actuated means adapted when connected to said pump to move said body relative to said frame, second hydraulically actuated means adapted when connected to said pump to move said tailgate relative to said frame, and means for alternatively connecting said pump to said first and said second hydraulically actuated means.

13. In a vehicle, a frame, a body, a tailgate, means for selectively moving said body in a vertical sense relative to said frame, a hydraulic pump, first hydraulically actuated means adapted when connected to said pump to move said body in a horizontal sense relative to said frame, second hydraulically actuated means adapted when connected to said pump to move said tailgate relative to said frame, and means responsive to the vertical position of said body relative to said frame for alternatively connecting said pump to said first and said second hydraulically actuated means.

14. In a vehicle, a frame, a body having a door at its forward end, a cab on said frame, a rear door on said cab alignable with said body door, apparatus for moving said body relative to said frame, and means for disabling said apparatus if said cab door is open.

15. In a vehicle, a frame, a body, means for moving said body in a vertical sense relative to said frame, apparatus for moving said body forward relative to said frame, and means for disabling said apparatus unless said body is elevated at least a preselected distance above said frame.

16. In a vehicle, a frame, a cab mounted on said frame and extending thereabove, a body, means for moving said body upward relative to said frame to a point where its lower surface is above the level of the upper surface of said cab, apparatus for moving said body forward relative to said frame to a point wherein its forward edge is forward of the rear edge of said cab, and means for disabling said apparatus unless said body is elevated adequately to clear said cab during forward motion.

17. In a vehicle, a frame, a cab mounted on said frame, a body having a portion overlying said cab, apparatus for moving said body downwardly relative to said cab, and means for disabling said apparatus to move said body into engagement with said cab.

18. In a vehicle, a frame, a cab mounted on said frame, a body, apparatus for moving said body upward and downward relative to said frame, means for moving said body in a horizontal sense between a rear position and a forward position in which a portion thereof overlies a portion of said cab, and means for disabling said apparatus to move said body downwardly below a preselected spaced distance above said cab.

19. In a vehicle, a surface, a member adapted to support cargo, means for moving said member relative to said surface, and means effective when said member reaches a preselected minimum distance from said surface to automatically move said member away from said surface.

20. In a vehicle, a frame, a cab mounted on said frame, a body having a portion overlying said cab, apparatus for moving said body downwardly relative to said cab, and means effective when said body reaches a preselected minimum distance from said cab for automatically moving said body upwardly to a greater preselected distance from said cab.

21. In a vehicle, a frame, a cab mounted on said frame, a body having a portion overlying said cab, apparatus for moving said body downwardly relative to said cab, and means effective when said body reaches a preselected minimum distance from said cab for disabling said apparatus and for automatically moving said body upwardly to a greater preselected distance from said cab.

References Cited in the file of this patent

UNITED STATES PATENTS

| | | |
|---|---|---|
| 945,964 | Lincoln | Jan. 11, 1910 |
| 2,027,421 | Eisenberg | Jan. 14, 1936 |
| 2,360,227 | Hemphill | Oct. 10, 1944 |
| 2,379,094 | Maxon | June 26, 1945 |
| 2,412,158 | Kuehlman et al. | Dec. 3, 1946 |
| 2,469,321 | Wood | May 3, 1949 |
| 2,523,723 | Santee et al. | Sept. 26, 1950 |
| 2,601,092 | Cardiff | June 17, 1952 |
| 2,603,368 | Vance | July 15, 1952 |
| 2,616,768 | Stemm | Nov. 4, 1952 |
| 2,635,771 | Black | Apr. 21, 1953 |